(12) United States Patent
Gjolmesli et al.

(10) Patent No.: US 12,241,568 B2
(45) Date of Patent: Mar. 4, 2025

(54) CABLE PROTECTION SYSTEM

(71) Applicant: NEXANS, Courbevoie (FR)

(72) Inventors: Elisabeth Gjolmesli, Oslo (NO); Rayhan Habibie, Halden (NO); Per Kristian Pedersen, Oslo (NO)

(73) Assignee: NEXANS, Courbevoie (FR)

( * ) Notice: Subject to any disclaimer, the term of this patent is extended or adjusted under 35 U.S.C. 154(b) by 165 days.

(21) Appl. No.: 17/749,036

(22) Filed: May 19, 2022

(65) Prior Publication Data

US 2022/0407301 A1 Dec. 22, 2022

(30) Foreign Application Priority Data

May 27, 2021 (EP) .................................... 21305701

(51) Int. Cl.
*F16L 1/24* (2006.01)
*H02G 9/02* (2006.01)

(52) U.S. Cl.
CPC ................ *F16L 1/24* (2013.01); *H02G 9/025* (2013.01)

(58) Field of Classification Search
CPC ............... F16L 1/20; F16L 1/24; H02G 9/025
USPC ...................... 405/172, 211.1, 216
See application file for complete search history.

(56) References Cited

U.S. PATENT DOCUMENTS

| | | | | |
|---|---|---|---|---|
| 4,273,833 A | * | 6/1981 | De Long | C09D 5/1668 427/372.2 |
| 2010/0228295 A1 | * | 9/2010 | Whitefield | F16L 1/123 606/279 |
| 2012/0304447 A1 | * | 12/2012 | Smith | F16L 1/123 29/434 |
| 2014/0377010 A1 | * | 12/2014 | Van Belkom | F16L 1/123 405/168.1 |
| 2016/0186893 A1 | * | 6/2016 | Nakovski | F16L 57/02 138/110 |
| 2019/0214801 A1 | * | 7/2019 | Smith | H02G 1/10 |
| 2020/0325646 A1 | * | 10/2020 | Harbison | H02G 1/081 |

FOREIGN PATENT DOCUMENTS

| | | | | |
|---|---|---|---|---|
| CA | 3138858 A1 | * | 11/2020 | ........... E21B 17/017 |
| EP | 3564569 A1 | * | 11/2019 | ............. F16L 1/123 |
| GB | 2413219 A | * | 10/2005 | ........... E21B 17/017 |
| GB | 2544075 A | * | 5/2017 | ............. F16L 1/123 |
| GB | 2582305 A | * | 9/2020 | ........... E21B 17/017 |
| WO | 2008/139190 | | 11/2008 | |
| WO | WO-2015071684 A2 | * | 5/2015 | ........... E21B 17/017 |
| WO | WO-2015104560 A1 | * | 7/2015 | ........... E21B 17/017 |
| WO | WO-2019043412 A1 | * | 3/2019 | ........... E21B 17/017 |

OTHER PUBLICATIONS

Cable Wires & et al: The Latest Advancements in Submarine Cables Protection in Focus Jul. 14, 2019, Retrieved from the Internet: URL:https://www.windsystemsmag.com/wp-content/uploads/2019/06/0719-IF-I.pdf.
European Search Report dated Oct. 21, 2021.

* cited by examiner

*Primary Examiner* — Frederick L Lagman
(74) *Attorney, Agent, or Firm* — Sofer & Haroun, LLP

(57) ABSTRACT

A power cable or umbilical with a cable protection system for stabilising a submarine power cable or umbilical in the free span between an offshore installation and the seabed. An offshore transfer system has an offshore structure, a power cable or umbilical and a receiving structure, the power cable or umbilical being protected in a non-supported section by such a cable protection system.

17 Claims, 3 Drawing Sheets

CABLE PROTECTION SYSTEM

RELATED APPLICATION

This application claims the benefit of priority from European Patent Application No. 21 305 701.1, filed on May 27, 2021, the entirety of which is incorporated by reference.

FIELD OF THE INVENTION

The present invention relates to a weighted cable protection system suited for protecting submarine power cables suspended in free spans.

BACKGROUND

Submarine power cables and umbilicals transmit power and electrical signals to and from offshore installations, such as bottom-fixed and floating wind turbine generators and oil & gas platforms. One or both ends of these submarine power cables and umbilicals is/are connected to an offshore installation. Between the offshore installation and the seabed the cable/umbilical is suspended and subjected to loads from waves, current and movements of the offshore installation. These loads cause variations in tension and curvature in the cable/umbilical that generate fatigue damage in the various cable/umbilical components.

WO 2019/058093 discloses a protection device for preventing damage to an elongated flexible member passing through an aperture, the device comprising a body portion, a latching element, and a plurality of bend limiting devices.

GB 2153962 discloses vortex spoiler for a riser comprising a perforated shroud adapted to surround and be spaced apart from the riser. Vortex shedding around a riser can lead to high- and low-pressure variations on the riser which can set up damaging vibrations. The spoiler reduces the formation of such vortices and thus protects the riser and is preferably installed at mid-span of the riser. It may be of plastics and may incorporate anti-fouling mesh.

EP 0494190 discloses a covering to protect a tubular sub-sea structure from fouling by marine organisms, said covering comprises metal sheeting wrapping of the sub-sea structure and serves to prevent or mitigate the build-up of fouling growth on the sub-sea structure. The metal sheeting comprises corrugated sheeting, whereby valley-form sheeting deformation extends in the axial direction on the sub-sea structure. The metal sheeting being formed by a helically wound strip which has deformations extending transversely on the strip, characterised in that the deformations are spaced on the strip and in that the strip portions between the deformations are substantially plain. The spacing of the deformations being arranged such that when the sheeting is formed on the tubular to be protected, at least one valley form deformation is present circumferentially in each transverse section of the covered tubular.

EP 1616377 discloses a protective device for cables and conduits, in particular for marine cables, having a plurality of pipe halves of which two pipe halves joined together in each case form a pipe element. The pipe elements joined to one another in series form a pipe for accommodating a cable or a conduit, wherein the pipe elements each have at a first end a ball-shaped section and at a second end opposite the first end a funnel-shaped section which is accommodated and held in place in the interior of the ball-shaped section of a neighbouring pipe element, characterised in that the pipe halves forming a pipe element are joined by regions in engagement with one another in the ball-shaped section, wherein on the outside the pipe element is free of sharp edges and projecting corners or edges.

WO 2008/139190 discloses an apparatus and a method to deploy cable to the bed of shallow water, in which the cable is pulled in through a guide by pulling in a detachable device attached to the cable, as well as a connector, which is connected to the pull-in device and has a through-passageway, and a protective sleeve, which is attached to the connector and also has a through-passageway, until the connector fastens via a push-fit action to the guide on or adjacent to the support structure, thereby also deploying the protective cable sleeve between the connector and the bed of the shallow water and providing a protected cable route between the guide and the bed of the shallow water. The protective sleeve means is formed from a series of interconnected successive sleeve shells and each interconnection may be corrodible.

Several solutions for protecting the submarine power cables and umbilicals are known. These cable protection systems prevent the cable from excessive bending and from deformation due to impact. They will as such provide protection against dropped objects, such as equipment from the offshore installation, and from cable/umbilical overbending due to for example strong currents. However, none of these solutions provide adequate protection against fatigue damage and ultimately failure of the cable.

OBJECTS AND SUMMARY OF THE INVENTION

The main objective of the invention is to provide a cable protection system which provides an increased protection of dynamical submarine power cables and umbilicals against fatigue.

The present invention is defined by the appended claims and in the following.

In a first aspect, the invention relates to a power cable or umbilical with a cable protection system for stabilizing a submarine power cable or umbilical in the free span between an offshore installation and the seabed, wherein the cable protection system comprises weighted elements arrangeable around a section of the power cable/umbilical in the free span, and wherein the weight/diameter ratio of the cable/umbilical and cable protection system combined is greater than the weight/diameter ratio of the cable/umbilical alone.

The free span refers to space(s) where the power cable or umbilical is unsupported along its length on the seabed for a distance, typically greater than 3 m. In particular, the free span refers to the space between the seabed and an offshore installation, in which space the cable/umbilical is suspended without any support from the seabed.

In another embodiment, the weight/diameter ratio of the cable/umbilical and cable protection system combined may be more than 2 times; of more than 3 times; of more than 5 times or of more than 7 times the weight/diameter ratio of the cable/umbilical alone.

In another embodiment, the weight/diameter ratio of the cable/umbilical and cable protection system combined may be between 1.5 and 20 times; between 2 and 15 times; between 3 and 10 times or between 5 and 10 times the weight/diameter ratio of the cable/umbilical alone.

As referred to herein the term "diameter" is the average outer diameter (over a length of interest) of the cable/umbilical and cable protection system combined or of the cable/umbilical alone. The person skilled in the art will understand that in the case where the cross section of the cable/umbilical and cable protection system combined or of the cable/umbilical alone has a non-circular circumference, the term "diameter" will refer to twice the longest radius (radial distance from the center to the circumference) of the cross section.

The weight/diameter ratio is thus the weight of respectively the cable/umbilical and cable protection system or the cable/umbilical alone in a section in the free span divided by respectively the average outer diameter of the cable/umbilical and cable protection system combined or of the cable/umbilical alone in a section in the free span.

In an embodiment of the invention, the weighted elements may be made of cast iron, aluminium or steel.

In an embodiment of the invention, the weighted elements may be moulds filled with lead.

In an embodiment of the invention, the weighted elements may be attached or assembled such that they provide resistance to bending of the cable, thereby effectively increasing cable/umbilical bending stiffness.

In another embodiment, the weighted elements may be covered with an antifouling layer.

In another embodiment, the antifouling layer may be an antifouling paint.

In another embodiment, the antifouling layer may be made of a polymer material with an anti-fouling agent.

In an embodiment, the weighted elements are cylindrical and made up of two interconnected halves.

In an embodiment, the weighted elements have a bend restricting design.

Here the person skilled in the art will understand that the weighted elements have a bend restricting design means that the weighted elements will be designed such that when assembled into the cable protection system, the bending of the cable protection system and of the cable or umbilical in it will be restricted or limited.

In an embodiment, the weighted elements have a bend stiffening design.

Here the person skilled in the art will understand that the weighted elements have a bend stiffening design means that the weighted elements have bend restricting design that provides increased bend stiffness in order to distribute the bending more widely.

In a second aspect, the invention relates to an offshore transfer system, the system comprising an offshore structure, a power cable or umbilical and a receiving structure, the power cable or umbilical comprises a first end connected to the offshore structure, a second end connected to the receiving structure and a middle section supported on/in a seabed, between the first end and the middle section, the power cable comprises a non-supported section suspended from the offshore structure, the non-supported section being protected by a cable protection system according to the first aspect of the invention.

In a third aspect, the invention relates to a method of stabilizing a submarine power cable or umbilical in the free span between an offshore installation and the seabed, the method comprising the step of:

arranging weighted elements around a length of the cable or umbilical suspended in the free span, forming a cable protection system, such that the weight/diameter ratio of the cable/umbilical and cable protection system combined is greater than the weight/diameter ratio of the cable/umbilical alone.

In an embodiment of the method, the cable protection system may have any other features defined in the first aspect of the invention.

BRIEF DESCRIPTION OF THE DRAWINGS

The present invention is described in detail by reference to the following drawings.

DETAILED DESCRIPTION

Figure 1:
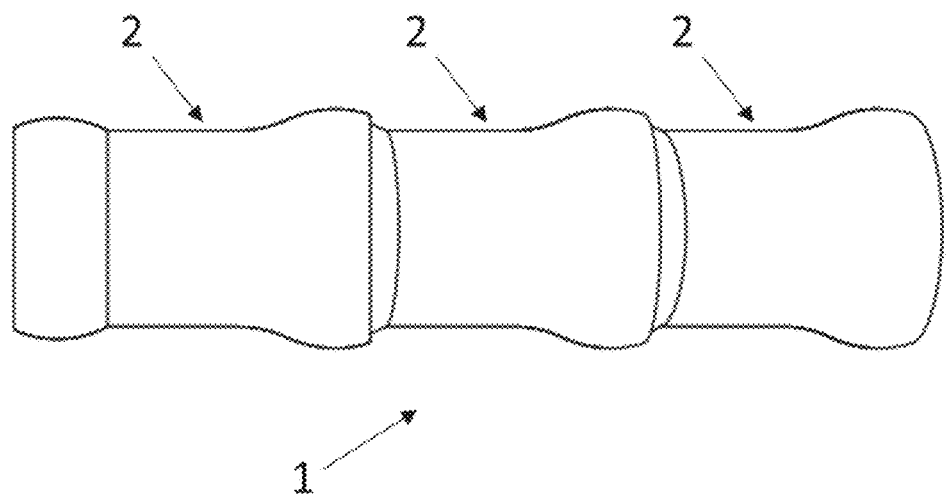
FIG. 1 is a top view of an example embodiment of the cable protection system

Submarine power cables or power umbilicals 6 transmit electrical power and/or signals between a power source and one or more consumers. The electrical power and/or signals can be transferred from shore to an offshore installation 7, between offshore installations, and from an offshore installation to shore.

Offshore installations can be bottom fixed, such as gravity based, jacket and compliant structures, as well as floating units used in offshore wind and oil & gas.

The power cable/umbilical 6 comprises a first end connected to an offshore installation, a second end connected to another offshore installation or a point onshore, and a middle section supported on/in the seabed. Between an offshore installation and the seabed, the cable is suspended in a free span. This section of the cable/umbilical is the section that is most likely to be damaged as a result of environmental loads or dropped objects. A cable protection system (CPS) 1 is therefore applied to protect this section of the cable.

Existing CPS solutions offer protection from dropped objects and cable over-bending but are less suited for protecting cables/umbilicals against excessive fatigue damage.

In the cable protection system 1, the non-supported section of the power cable/umbilical is protected by a cable protection system (CPS) 1 that comprises a plurality of weighted elements 2 arranged around the power cable to reduce motions that cause fatigue to the cable/umbilical components. By doing this, cable/umbilical fatigue life will be extended. This is important as changes to design and/or offshore operations to support/stabilize the cable/umbilical 6 are expensive and complex.

The cable protected by the CPS 1 will still be subjected to loads from waves, current and movements of the offshore installation. Due to an increase in the apparent diameter of the cable, these loads will increase. However, by increasing the weight/diameter ratio of the cable sufficiently, the motion of the protected cable will be reduced, and as a result fatigue damage in the various cable components will also be reduced.

In addition, it may be advantageous to combine existing solutions that provide impact protection and limit bending with the weighted elements of the current invention.

Figure 2:
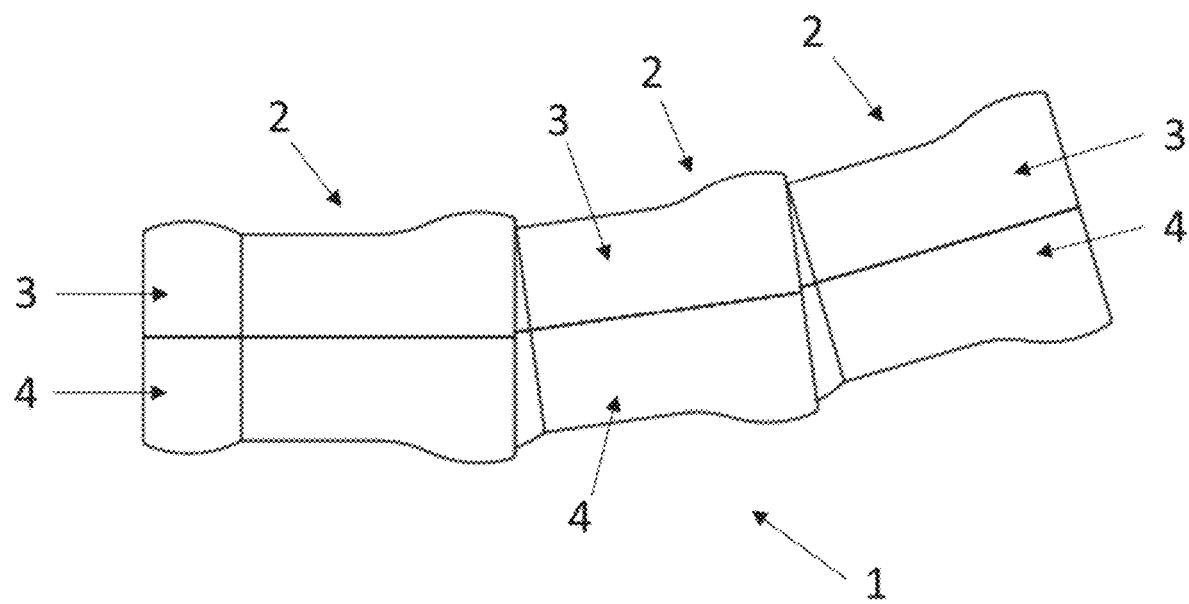
FIG. 2 is a lateral view of an example embodiment of the cable protection system

In an exemplary embodiment of the invention, the cable or umbilical with the CPS 1 showed on FIGS. 1 and 2 is made of weighted elements 2 assembled in series. Each weighted element 2 is made of two half shells 3; 4 of cast iron.

In an exemplary embodiment of the invention, the weighted elements 2 of the CPS 1 may for example be cast iron shells (traditionally used in sewage pipes), steel bend restrictors or bend stiffeners, or even moulds filled with lead.

In an exemplary embodiment of the invention, the weighted elements 2 of the CPS 1 are applied to the cable/umbilical over the suspended length between the offshore installation and the point of burial/stabilization on the seabed.

The weighted elements 2 may be attached or assembled such that they provide restriction to the bending of the cable protections system, thereby restricting the bending of the cable/umbilical.

The weighted elements 2 may be attached or assembled such that they provide resistance to bending of the cable/umbilical, thereby effectively increasing cable/umbilical bending stiffness.

In another exemplary embodiment, the lower half 4 of the weighted elements 2 are heavier than the upper half 3, preferably at least 20% heavier, preferably at least 30% heavier, preferably at least 50% heavier, preferably 100% heavier, preferably 150% heavier.

In addition, in the inventive offshore power system, in the free-span section, the weighted elements 2 of the CPS 1 may comprise an outer antifouling layer to prevent marine growth, which contributes to reducing cable response to both current and wave action. The synergistic solution can also result in increased cable bending stiffness, which reduces cable bending.

This antifouling layer may be applied to the outer surface of each weighted element 2.

In an embodiment of the invention, each weighted element 2 comprises an outer layer of anti-fouling paint, that is to say a layer applied to the weighted elements 2 to prevent marine growth. Such anti-fouling paint may for example be a biocide release system based on dissolution or hydrolysis of the binder, or a system based on a toxic material, such as copper metal or alloys, e.g. CuNi.

In an alternative embodiment, this layer is an anti-fouling layer such as a polymer layer with anti-fouling agent. An example of such an application is a polymer sheet containing CuNi particles, glued to the surface of the cable protection system.

Figure 3:
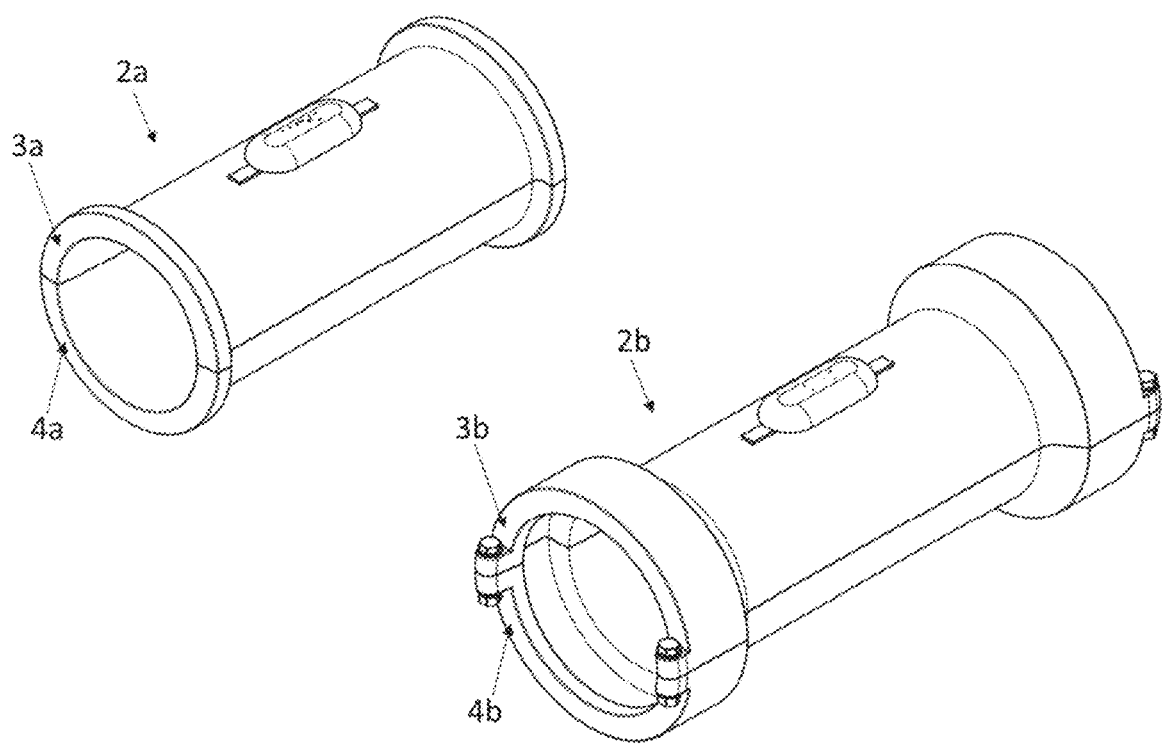
FIG. 3 is an isometric view of the weighted elements that, assembled, constitute a second embodiment of the cable protection system
Figure 4:
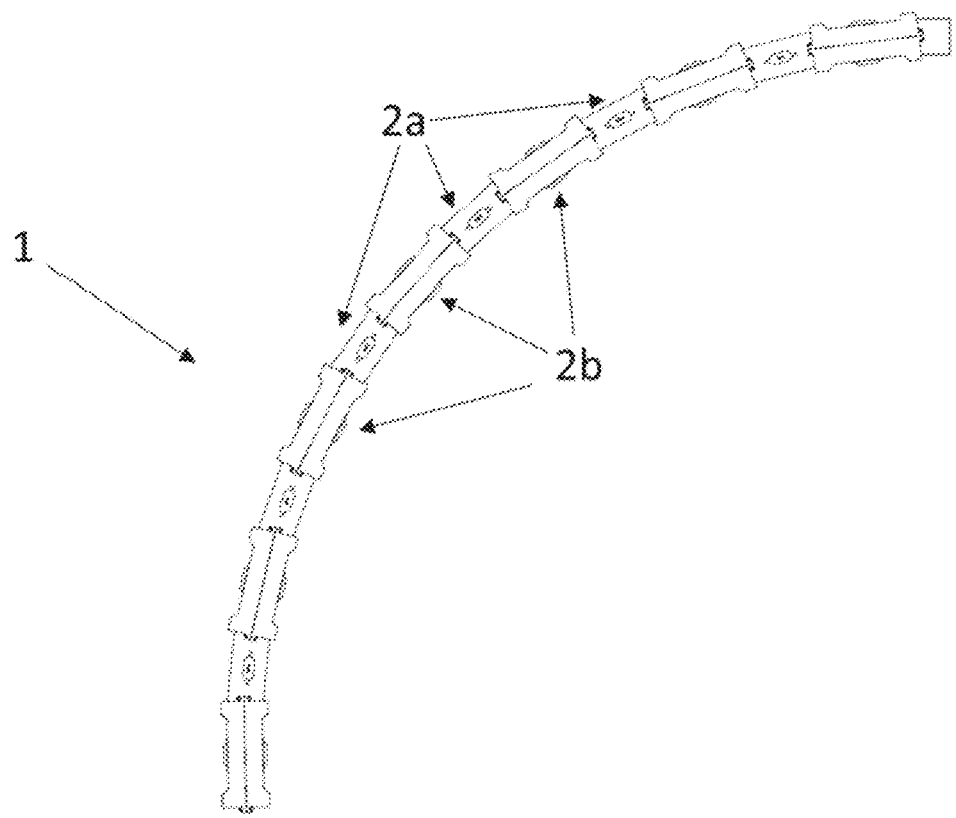
FIG. 4 is a side view of a second embodiment of the cable protection system

FIGS. 3 and 4 show another embodiment of the invention. The cable protection system 1 comprises two types of weighted elements 2a and 2b assembled in line alternatively. Each weighted element 2a; 2b is made of two half shells 3a; 4a and 3b; 4b respectively.

Figure 5:
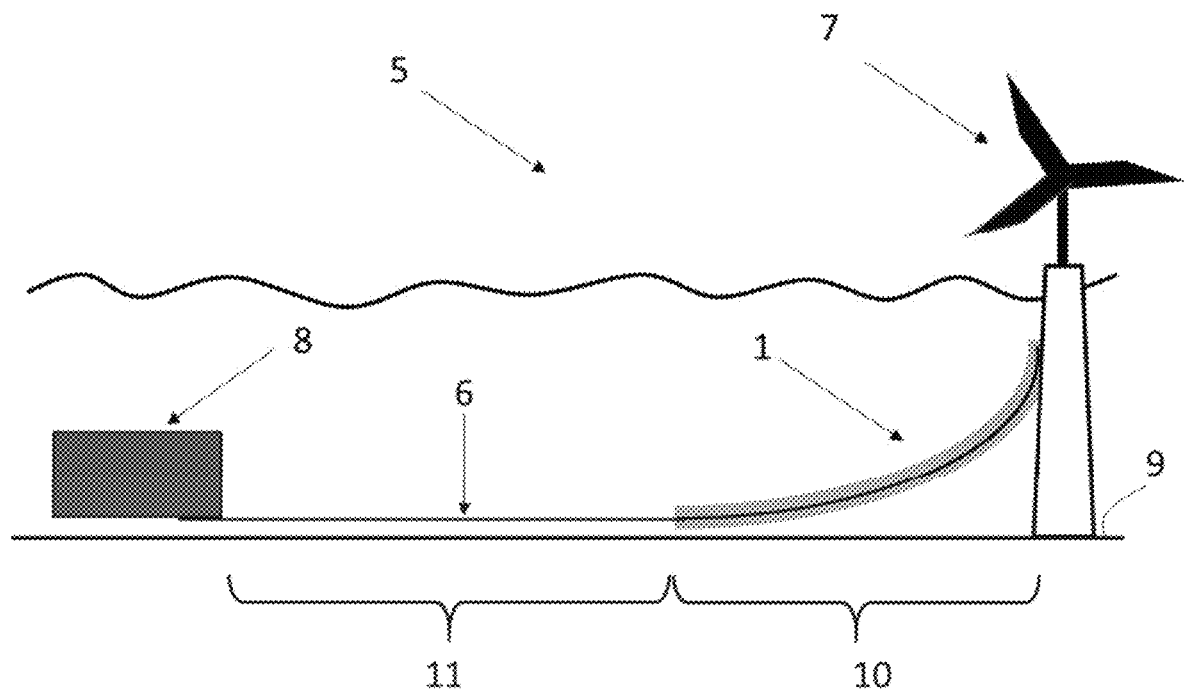
FIG. 5 is a schematic illustration of an offshore transfer system.

FIG. 5 is a schematic illustration of an offshore transfer system 5, the system 5 comprising an offshore structure 7, a power cable or umbilical 6 and a receiving structure 8, the power cable or umbilical 6 comprises a first end connected to the offshore structure 7, a second end connected to the receiving structure 8 and a middle section 11 supported on/in a seabed 9, between the first end and the middle section, the power cable or umbilical 6 comprises a non-supported (free span) section 10 suspended from the offshore structure 7, the non-supported section being protected by a cable protection system 1.

Although the offshore structure 7 is depicted as a fixed platform, anchored directly onto the seabed, the person skilled in the art will understand that the offshore structure can be of any type, fixed, floating and otherwise.

With existing solutions, the drag forces on the cable/umbilical 6 would normally increase significantly during the lifetime of a cable. By combining the properties of the weighted elements with antifouling properties, the weight/diameter ratio of the protected cable in the free-span section is maintained over time, because the apparent diameter of cable does not increase due to fouling. The drag forces on the cable/umbilical 6 will therefore not increase over time.

The invention claimed is:

1. A cable or umbilical with a cable protection system for stabilising a submarine power cable or umbilical in a free span between an offshore installation and the seabed, said cable protection system comprising:
   weighted elements arrangeable around a section of the power cable or umbilical in the free span,
   wherein a weight/diameter ratio of the cable or umbilical and cable protection system combined in a section of the free span is greater than a weight/diameter ratio of the cable or umbilical alone in the section of the free span, wherein the free span is a space between the seabed and an offshore installation in which space the cable/umbilical is suspended without any support from the seabed.

2. The cable or umbilical with a cable protection system according to claim 1, wherein the weight/diameter ratio of the cable or umbilical and cable protection system combined may be more than 2 times the weight/diameter ratio of the cable/umbilical alone.

3. The cable or umbilical with a cable protection system according to claim 1, wherein the weight/diameter ratio of the cable or umbilical and cable protection system combined may be between 1.5 and 20 times the weight/diameter ratio of the cable or umbilical alone.

4. The cable or umbilical with a cable protection system according to claim 1, wherein the weight/diameter ratio of the cable or umbilical and cable protection system combined may be between 5 and 10 times the weight/diameter ratio of the cable/umbilical alone.

5. The cable or umbilical with a cable protection system according to claim 1, wherein the weighted elements are covered with an antifouling layer.

6. The cable or umbilical with a cable protection system according to claim 5, wherein the antifouling layer is an antifouling paint.

7. The cable or umbilical with a cable protection system according to claim 6, wherein the antifouling layer is an antifouling paint including either one of a biocide release system based on dissolution or hydrolysis of the binder, or a toxic material including any one of copper metal, copper alloys or CuNi.

8. The cable or umbilical with a cable protection system according to claim 5, wherein the antifouling layer is made of a polymer material with an anti-fouling agent.

9. The cable or umbilical with a cable protection system according to claim 8, wherein the antifouling layer a polymer sheet containing CuNi particles, glued to the surface of said weighted elements.

10. The cable or umbilical with a cable protection system according to claim 1, wherein the weighted elements are cylindrical and made up of two interconnected halves.

11. The cable or umbilical with a cable protection system according to claim 10, wherein the two interconnected halves include both an upper half and a lower half, and where the lower half is heavier than the upper half.

12. The cable or umbilical with a cable protection system according to claim 11, wherein the lower half is heavier than the upper half by at least 20%.

13. The cable or umbilical with a cable protection system according to claim 12, wherein the lower half is heavier than the upper half by 20% to 150%.

14. The cable or umbilical with a cable protection system according to claim 1, wherein the weighted elements have a bend restricting design.

15. The cable or umbilical with a cable protection system according to claim 1, wherein the weighted elements have a bend stiffening design.

16. An offshore transfer system, the system comprising:
    an offshore structure,
    a power cable or umbilical, and
    a receiving structure,
    wherein the power cable or umbilical has a first end connected to the offshore structure, a second end connected to the receiving structure and a middle section supported on/in a seabed,
    wherein between the first end and the middle section, the power cable or umbilical has a non-supported section suspended from the offshore structure, and
    wherein the non-supported section is protected by a cable protection system according to claim 1.

17. A method for stabilising a submarine power cable or umbilical in a free span between an offshore installation and the seabed, the method comprising the step of:
    arranging weighted elements around a length of the cable or umbilical suspended in the free span,
    forming a cable protection system, such that the weight/diameter ratio of the cable/umbilical and cable protection system combined in a section of the free span is greater than the weight/diameter ratio of the cable/umbilical alone in the section of the free span, wherein the free span is a space between the seabed and an offshore installation in which space the cable/umbilical is suspended without any support from the seabed.

* * * * *